FREQUENCY DISCRIMINATOR

Filed Aug. 30, 1965 4 Sheets-Sheet 1

INVENTOR.
WALDEMAR SAEGER

BY Anthony D. Cennamo

ATTORNEYS

Nov. 19, 1968 W. SAEGER 3,412,205

FREQUENCY DISCRIMINATOR

Filed Aug. 30, 1965 4 Sheets-Sheet 2

INVENTOR.
WALDEMAR SAEGER

BY Anthony D. Cennamo

ATTORNEYS

Nov. 19, 1968 W. SAEGER 3,412,205

FREQUENCY DISCRIMINATOR

Filed Aug. 30, 1965 4 Sheets-Sheet 3

INVENTOR.
WALDEMAR SAEGER

BY Anthony D. Cennamo

ATTORNEYS

Nov. 19, 1968 W. SAEGER 3,412,205

FREQUENCY DISCRIMINATOR

Filed Aug. 30, 1965 4 Sheets-Sheet 4

INVENTOR.
WALDEMAR SAEGER

BY Anthony D. Cennamo

ATTORNEYS

United States Patent Office 3,412,205
Patented Nov. 19, 1968

3,412,205

FREQUENCY DISCRIMINATOR

Waldemar Saeger, La Canada, Calif., assignor to Xerox Corporation, Rochester, N.Y., a corporation of New York Filed Aug. 30, 1965, Ser. No. 483,592
12 Claims. (Cl. 178—66)

ABSTRACT OF THE DISCLOSURE

A method and apparatus for demodulating binary encoded signals by utilizing logical gating means. A timing network or integrator generates a time-dependent waveform in response to pulses applied thereto, said pulses representing the respective zero crossovers of the encoded signal and AND gating the time dependent waveform with said zero crossover pulses, the output of said AND gate being utilized to generate decoded binary signals.

This invention relates to a frequency shift-keyed facsimile communication system and, more particularly, to a method and apparatus for demodulating frequency shift-keyed, binarily encoded signals.

In facsimile and other data communication systems, which require the transmission of binary signals, it is common to use a frequency shift-keyed system to generate a modulated signal for convenient transmission. The demodulator for such a system must determine which of a plurality of frequencies is present in order to ascertain whether the signal coming off the line is indicative of a binary "1" or "0" condition. Normally, binarily encoded frequency shift-keyed signals are detected by a plurality of tuned circuits, each being selectively responsive to one of the two respective frequencies. The major disadvantages of this type of system include high cost, low interchangeability and slow response time in that for a filter to respond, a predetermined period of time must elapse in order for the filter to achieve resonance and detect the resonant frequency. Quite often, in such systems it is desirable that the modulating binary pulse be as short as or shorter than the period of the higher frequency carrier wave. To achieve maximum bandwidth utilization, especially in telephone line systems, it is essential that the demodulator be capable of detecting extremely rapid changes in frequency to accommodate the maximum bit rate.

It is, therefore, an object of this invention to provide an improved demodulation technique for a binarily encoded frequency shift-keying communication system.

Another object of this invention is to demodulate binarily encoded frequency shift modulated signals without the use of tuned circuits.

Still another object of this invention is to achieve maximum bandwidth utilization capability in frequency shift modulated telephone line communication systems for detecting extremely high bit rates of binary data.

Yet another object of this invention is to provide a digital logical system for demodulating frequency shift encoded data signals.

Yet still another object of this invention is to provide improved apparatus for demodulating frequency shift modulated signals.

The foregoing objects and other desirable aspects are accomplished in accordance with one aspect of the present invention by instantaneously charging an integrating circuit in response to a delayed, predetermined or shaped signal indicative of a zero crossing of the transmitted signal and sampling the level of the integrator circuit with a subsequent shaped signal indicative of a later zero crossing of the transmitted signal. The time constant of the integrating circuit is preferably chosen such that the integrator discharges below a threshold level during a predetermined portion of the period of the lower carrier frequency, i.e., the carrier frequency representative of a binary "0," but remains above the threshold level during a similar period of the higher carrier frequency, i.e., the frequency representative of the binary "1." The sampled and sampling signals are subsequently applied as the inputs of a logical AND gate which generates an output in response to the detection of a binary "1," i.e., when the output of the integrating circuit remains above the threshold level during the sampling time.

For a more complete understanding of the invention, reference may be had to the following detailed description in conjunction with the drawings in which.

Figure 1:
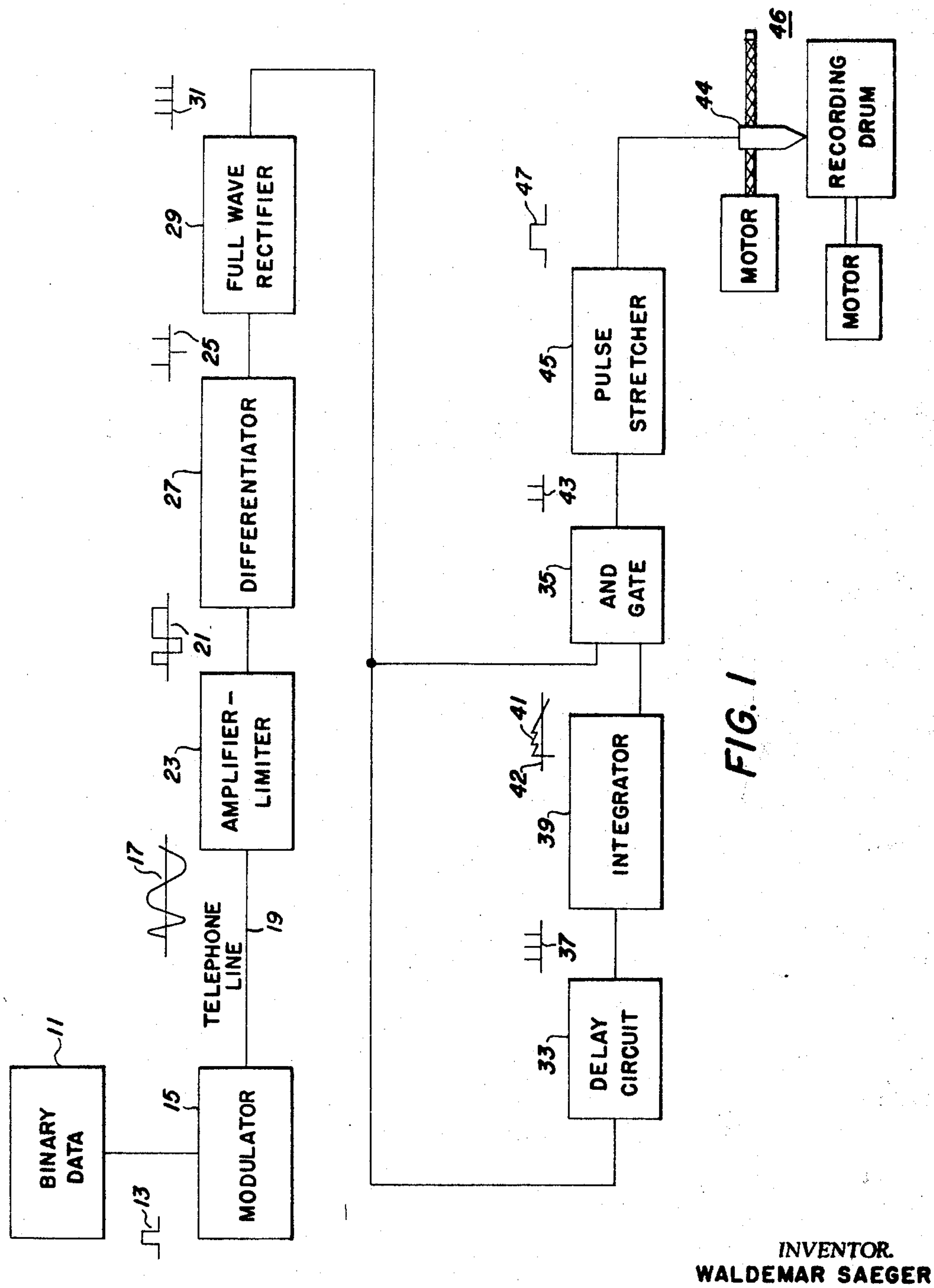
FIG. 1 is a block diagram of a frequency shift keyed communication system in accordance with one embodiment of the invention.

Referring now to FIG. 1, there is shown a binary data source 11 providing an input 13 to a frequency shift modulator 15. In response to data from source 11, modulator 15 generates transmission signals 17 to be sent over a communication link, for example, a telephone line 19. The information transmitted may be either a "1" or a "0," for suitable use, for example, in a facsimile system, and is represented by one of two discrete frequencies in the signal. Any suitable pair of frequencies may be used. For example, typical space and mark, or "1" or "0," frequencies over telephone systems are 1300 and 2300 c.p.s., respectively. After receipt at the receiver end of telephone line 19, the signals 17 may be filtered before being converted into squared waveforms 21 in amplifier-limiter 23. Waveforms 21 facilitate the generation of a series of positive and negative pulses 25 corresponding to the transition or zero crossover points of the transmitted signal 17 in differentiator 27. Pulses or spikes 25 are then rectified by a full wave rectifier 29, thereby generating a series of unipolar pulses 31. These rectified pulses 31 are then applied to two inputs in parallel. The first input is to a delay circuit 33 which delays the pulse by a predetermined amount, preferably at least slightly greater than the width of a pulse 31. The second input, to which pulses 31 are applied, is an amplitude sensitive AND gate 35 for a purpose to be hereinafter more fully described.

The delayed pulses 37 are fed to the input of an integrator 39. Preferably integrator 39 is designed to have a substantially instantaneous charge time and a finite discharge time. The function of integrator 39 is to generate time-dependent transition pulses corresponding to the zero crossovers of the transmitted signal. If the pulses 31 are closely spaced, i.e., the higher pulse repetition frequency, then the integrator will have little opportunity to discharge between pulses. However, if the pulses are far apart, i.e., the lower pulse repetition frequency, then the integrator will have a longer period to discharge between pulses. By selecting a suitable time constant, output signals 41 of integrator 39 will or will not remain above a predetermined threshold level depending upon the respective intervals between adjacent pulses 31. Signals 41 are then subsequently AND-gated with the original train of pulses 31 in AND gate 35. AND gate 35 may be of any type well known in the art which is characterized in that an output signal 43 will occur if, and only if, there is simultaneously a signal 31 and a signal 41 greater than a predetermined threshold level at the respective inputs of the AND gate 35. Since the latter condition exists only during the shorter interval between pulses 31, i.e., the higher carrier pulse repetition frequency, what is generated by AND gate 35 is a series of positionally coded pulses 43 representing each one-half period of the high frequency input signal.

The output signals 43 of AND gate 35 may then be reconstituted into a one and zero binary signal train for input to a facsimile recording device or the like by any suitable pulse stretching device 45. The facsimile recording device may be of any type well known in the art. For example, the detected pulses emanating from AND gate 35 may be employed to actuate a translatably supported marking element 44 which is cooperably juxtapositioned with a rotatably supported recording drum 46. Further, the pulse stretching device, which is optional, may comprise a one-shot multivibrator. As is known in the art, the characteristic of a reset one-shot multivibrator is that a pulse of a predetermined period will be emitted in response to each input pulse and, if a second or *n* successive pulses, where *n* is an integer, occurs during this and successive predetermined intervals, then a second or *n* successive output pulses will be generated. Thus, as will be hereinafter more fully described, the output waveform train, thus generated, will be a faithful reproduction of the binary input signals which were applied to the input of modulator 15 at the transmission end with the output signals 43 being respectively delayed by one-half the high frequency pulse period.

Figure 2:
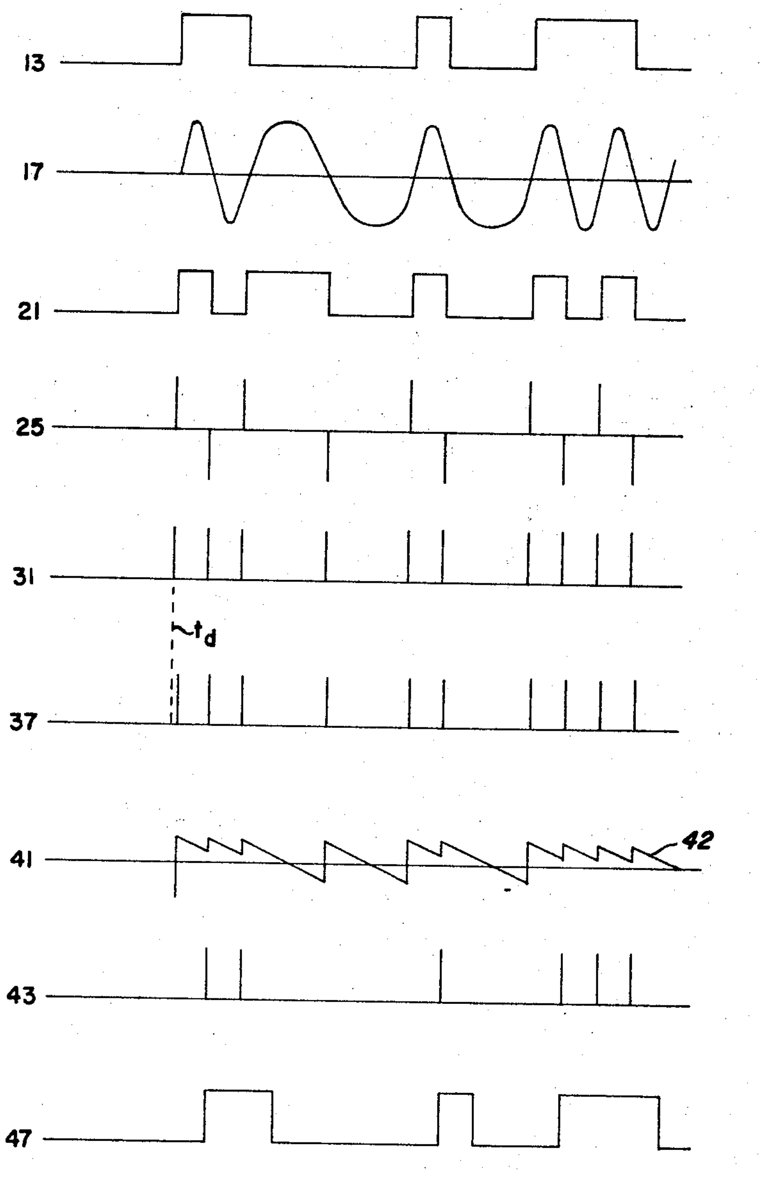
FIG. 2 is a group of idealized voltage-time waveforms which appear at various points during the operation of the system illustrated in FIG. 1.

The operation of the embodiment of the demodulator illustrated in FIG. 1 will now be further explained by considering the interrelationship between the various voltage-time waveforms as illustrated in FIG. 2 which characterize the invention, with like numerals being used to correspond with the block diagram in FIG. 1. First there is shown a binary input signal or train 13 comprising substantially square waveforms. When this input wave train is supplied to the modulator, referred to hereinabove, a frequency shift modulated waveform 17 is generated and transmitted via the telephone line. Illustratively, the transmitted frequency is higher when the input signal to the modulator is high, i.e., a binary "1," and the frequency is low when the input is low, i.e., a binary "0." However, the reverse coding scheme could be accommodated by suitable changes in the integrator and logical AND gate. Waveform 21 has been amplified and limited at the receiver end such that the transitions effectively indicate the zero crossover points of waveform 17. After differentiation, as is known in the art, a series of positive and negative spikes result as shown by waveform 25. When these pulses or spikes 25 are applied to a full wave rectifier, a series of unipolarity pulses are generated similar to those shown as waveform 31.

A comparison on a time basis of waveform 37, which is the output of the delay network, with waveform 31 illustrates the delay interval $t_d$ of the time delay network. By applying waveform 37 to the input of the integrator network, which as stated above, charges substantially instantaneously, but has a finite discharge time, the delayed pulses 37 are converted into a saw-tooth type wave wherein the instantaneous amplitude of waveform 41 is a function of the pulse repetition rate of waveform 37. As hereinabove stated, AND gate 35 is arranged to produce an output waveform 43 when a signal 31 and a signal 41 greater than a predetermined threshold level 42 are simultaneously applied to the respective inputs of the AND gate. This train of pulses 43 may be suitable for certain control applications or alternatively a one-shot multivibrator may be triggered thereby to reconstitute spikes 43 into a bi-level pulse pattern 47 similar to that applied to the input of the modulator described above. A time comparison of waveforms 13 and 47 illustrates that waveform 47 has been delayed by approximately one-half of the high frequency pulse period to facilitate reliable sampling of the delayed pulse in the AND gate to detect the presence of a signal indicative of a binary "1."

Figure 3:
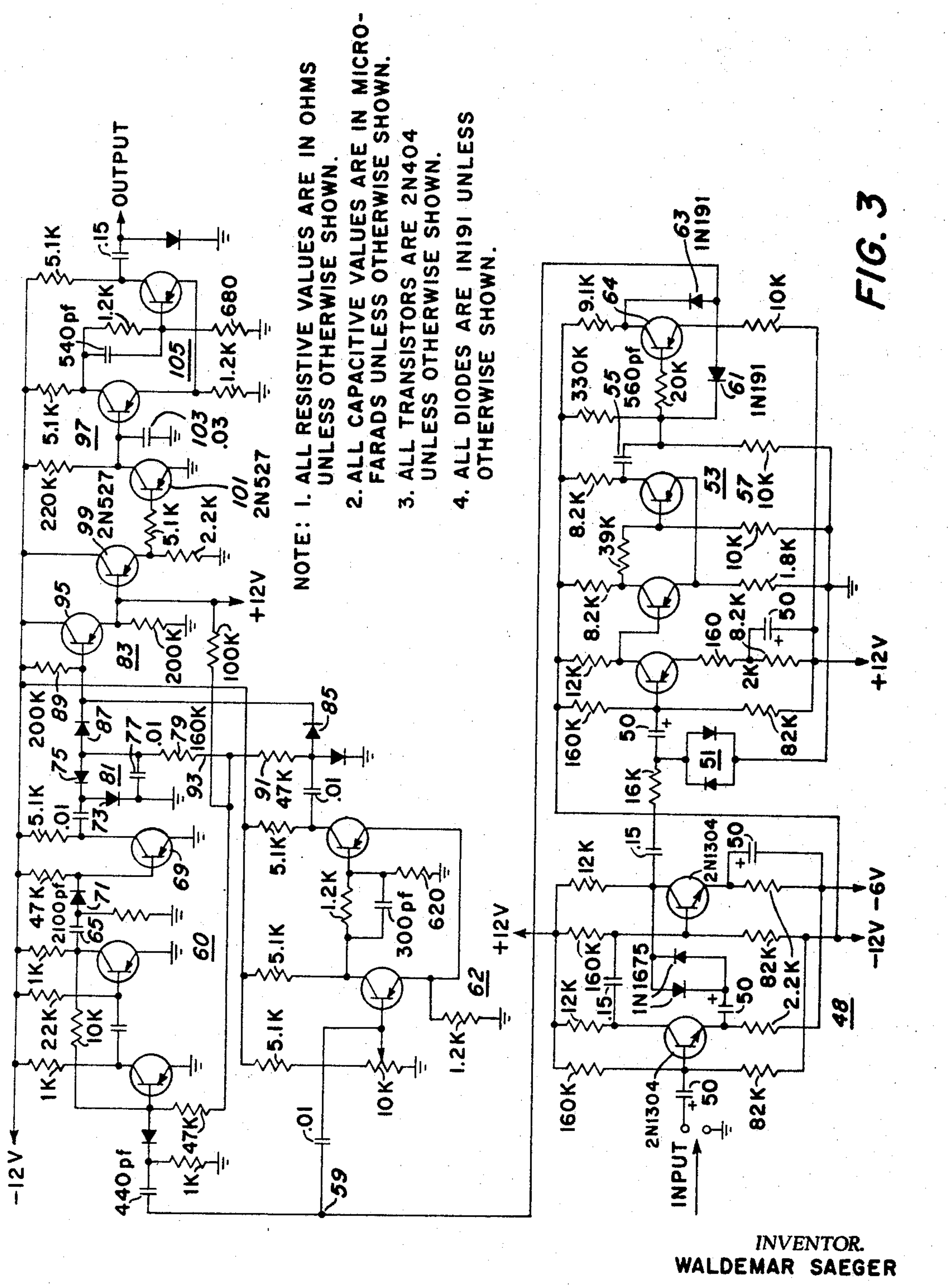
FIG. 3 is a schematic diagram of a frequency shift keyed demodulator according to a first embodiment of the invention as shown in FIG. 1.

Referring now to FIG. 3 there is shown a schematic diagram of a transistorized demodulator according to the first embodiment of the invention as shown in the block diagram of FIG. 1. The received frequency shift-keyed modulated waveforms, which resemble a sine wave of varying frequency, are coupled, for example, by an inductive pick-up from a telephone receiver to the input of a zero crossover detector 48. As shown, zero crossover detector 48, which is employed to produce pulses corresponding with each zeo crossover of the input waveform, comprises a high gain amplifier for squaring the input wave, a limiter for further shaping the input waves, a Schmitt trigger for generating output square waves in response to the squared input waves, a differentiating network for generating spike-like pulses corresponding to the tansitions of the square waves and a full wave rectifier for generating unipolarity pulses from the differentiated pulses. As shown, a diode feedback network coupled from the collector of a second stage to the emitter of the first stage is employed to achieve variable gain operation. For low level signals the diodes are essentially back-biased and no feedback exists. However, as the signal level increases, the diodes breakdown and the gain of the amplifier is thereby considerably reduced. The output of the high gain amplifier stage is further shaped by the parallel diode network 51. After amplification, the squared signals are applied to the input of the Schmitt trigger which in turn drives the differentiator network 53 including a capacitor 55 and resistor 57. The negative pulses out of the differentiator are coupled via diode 61 to junction 59 while the positive pulses out of the differentiator corresponding to the other zero crossover associated with the input signal are inverted through transistor 64 and then coupled to junction 59 through diode 63. Thus, the output of the zero crossover detector consists of two spaced-apart negative pulses related to two respective zero-crossovers of each input signal.

As shown in FIG. 3, the output zero-crossover detector 48 is applied to a junction 59 which is coupled to two pulse responsive circuits 60 and 62. Pulse responsive circuit 60 corresponds essentially to the delay circuit 33 in FIG. 1 and as shown, may comprise a one-shot multivibrator, which may be of any type well known in the art, a differentiator circuit including capacitor 65 and resistor 67 and a pulse inverter 69 in cascade therewith. The output of the one-shot is differentiated and the leading edge is removed by coupling diode 71. The output pulse generated in response to an input signal is thus timed-displaced from the removed leading edge by a predetermined amount. This output pulse is then inverted in inverter 69 and the output of inverter 69 is selectively coupled via diodes 73 and 75 respectively to the terminals of capacitor 77 which in combination with resistor 79 comprise an integrator network 81. Pulse responsive circuit 62 corresponds essentially to the direct input to the AND gate 35 of FIG. 1 and as shown, may comprise a Schmitt trigger, or any type pulse generator well known in the art.

The output of integrator network 81 and the pulse responsive circuit 62 are coupled to the respective inputs of a two input AND gate 83. AND gate 83 may be of any type well known in the art, for example, that shown comprises a diode-resistor AND gate including diodes 85 and 87 and a resistor 89. The respective diodes 85 and 87 are normally forward biased by the positive potential coupled to the respective anode electrodes via resistor 91 and a path including resistor 79 and conductor 93. AND gate 83 is designed to produce an output signal only when its two inputs are simultaneously true. Thus the output of AND gate 83 is a function of the pulse repetition frequency of the pulses emanating from the zero-crossover detector 48 and the decay time constant of integrator network 81.

Assuming that the higher transmitted frequency is indicative of a binary "1" and that the time constant of the integrator circuit is chosen such that the instantaneous output level of the integrator after a pulse is applied thereto remains above a threshold level only for a period of time corresponding to approximately one-half cycle of the higher frequency, then both inputs of the AND gate 83 will be true only when the higher transmitted frequency corresponding to a binary "1" is received. Conversely when a lower frequency corresponding to a binary "0" is received, the integrator circuit, which was instantaneously charged in response to a signal corresponding to the first zero-crossover, will decay below the threshold level required to trigger the AND gate before the next zero-crossover indicating pulse, which is used to sample the level of the integrator, is applied to junction 59. Thus, in response to the lower frequency, only the undelayed pulse via pulse responsive network 62 is applied to the AND gate and therefore the output of the AND gate is false, i.e., indicative of a binary "0."

The output of AND gate 83 may be coupled to a suitable buffer amplifier, for example, an emitter follower 95. As hereinabove explained, the output of the logical AND gate which generally comprises spikes, as shown in waveform 43 of FIG. 2, may be employed for certain control applications, for example, to control a facsimile recorder. Alternatively, the output spikes may be utilized to trigger a suitable pulse stretcher network 97 to regenerate a bi-level pulse pattern similar to that applied to the input of the modulator at the transmitter. As shown, a suitable pulse stretcher network may comprise a ramp generator including transistors 99 and 101 and capacitor 103 and a Schmitt trigger 105 responsive to the output of the ramp generator.

Figure 4:
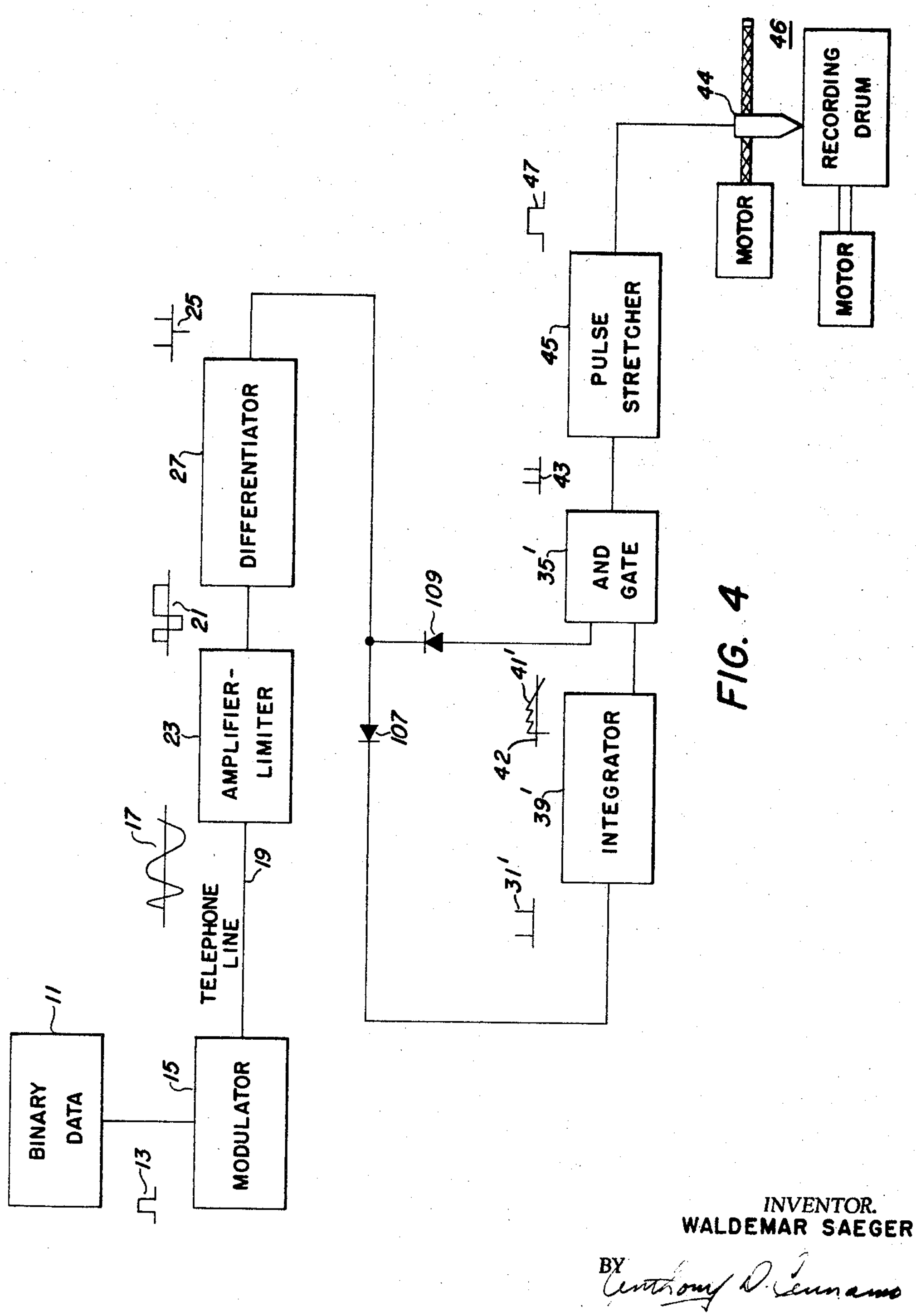
FIG. 4 is a block diagram of a frequency shift-keyed communication system in accordance with a second embodiment of the invention.

Referring now to FIG. 4 a communication system embodying a digital demodulator in accordance with a second aspect of the invention will be explained. The communication system as shown in FIG. 4 is essentially similar in structure and operation to that shown and explained in conjunction with FIGS. 1, 2 and 3 with the full wave rectifier and delay circuit eliminated and with steering diodes added for selectively routing the bi-polar output pulses from the differentiator circuit. Because of this similarity in structure and operation only the structural differences and their effect on the system operation will be explained in detail.

By selectively routing the bi-polar pulses emanating from the differentiator 27 through oppositely pulled diodes 107 and 109 integrator 39' is charged or triggered with a first polarity spike and then the integrator level, in a manner similar to the hereinabove described operation, is sampled with the opposite polarity, next successive spike. Thus, by utilizing the inherent delay or time offset between the respective leading and trailing edge of the substantially square wave pulses emanating from the amplifier-limiter 23, it is possible to eliminate the delay circuit. The integrator circuit 39' and the logical AND gate 35' are preferably similar in structure and operation to those described above with respect to FIG. 1, with additional inverter circuits or other design parameters being modified to achieve signal polarity compatability. For example, the circuit illustrated in FIG. 3 may be adapted to function in accordance with the embodiment of the invention illustrated in FIG. 4 by eliminating diodes 61 and 63 and transistor 64 of the full wave rectifier and directly coupling the pulses from the differentiator through oppositely poled diodes to the respective inputs to pulse responsive circuits 60 and 62. Further, the delay of pulse responsive circuit 60 may be eliminated and signal compatability achieved by shifting the inverter 69 from the output of pulse responsive circuit 60 to the input circuit of pulse responsive circuit 62.

In operation, after the zero-crossovers are detected by amplifying and squaring the received varying frequency sine waves, the respective spikes resulting from the differentiated square wave pulses are selectively coupled to the integrator 39' and AND gate 35' via diodes 107 and 109 respectively. By using, for example, as shown, the positive spike to instantaneously charge integrator network 39' and the associated, i.e., the next successive, negative spike to sample the level of the integrator 39' at a later time, it is possible to detect, in a manner similar to the hereinabove explained method, the presence of the higher frequency pulse which has been defined as indicative of the presence of a binary "1." Similarly, in the presence of a low frequency signal, the output level of integrator 39' decays below a predetermined threshold level before the application of the associated sampling pulse and thus an output is generated from AND gate 35' only in response to the presence of the higher frequency signals indicative of a binary "1." As hereinabove explained, in conjunction with FIG. 1, the signals emanating from AND gate 35' may be utilized to control the actuation of any suitable marking device 44 of a facsimile recorder 46.

By the foregoing description there is disclosed various improved methods and novel apparatus for demodulating frequency shift-keyed binarily encoded signals by selectively actuating logical gating means. The disclosed methods and apparatus teach the use of a timing network for generating a time dependent waveform in response to the application of pulses corresponding to the respective zero-crossovers of the transmitted sinusoidal waveform and subsequently AND gating these time dependent pulses with the train of zero-crossover pulses. Depending upon the respective pulse repetition frequency of the zero-crossover pulses and the time constant of the timing network, the output level of the timing network either remains above or decays below a predetermined threshold level before a next successive zero-crossover pulse time. Since the time constant of the timing network is preferably chosen such that the output level of the timing network decays below the threshold level during a half-cycle of the lower transmitter frequency, the output of the AND gate is true only when the time between successive zero-crossing pulses is substantially equal to a half-period of the high frequency transmitted wave. Therefore, since the higher frequency wave was chosen to define a binary "1" in the modulated wave, the output pulses generated by the AND gate corresponds to the binary information of the modulated wave.

The foregoing description and drawings are to be understood to be exemplary only and in no way limiting. As would be evident to those skilled in the art, modifications may be made in the various circuit configurations as well as the signal levels and the type of logical circuitry without departing from the spirit of the invention. It is therefore, applicant's intention to be limited only as indicated by the scope of the appended claims.

What is claimed is:

1. A binary information transfer system comprising:

(a) a binary data source;

(b) means for generating frequency shift signals representative of said binary data;

(c) a communication link for transmitting said signals to a predetermined point;

(d) means at said point for receiving and converting said signals into short duration pulses representative of zero-crossings;

(e) means for obtaining time-dependent pulses from the zero-crossing pulses in which the amplitude portion lying above a predetermined level corresponds to one state of said binary data;

(f) means for gating said time-dependent pulses with said zero-crossing pulses; and (g) means responsive to said gating means for restoring said binary data to its original form.

2. A transfer system according to claim 1 wherein the means for obtaining said time-dependent pulses includes a time delay circuit.

3. A method of demodulating frequency shift binary coded signals comprising the steps of:

(a) converting said signals into square shaped pulses representative of zero-crossings;

(b) differentiating said zero-crossing pulses into a series of positive and negative pulses;

(c) rectifying said series of pulses;

(d) generating time-dependent pulses representative of said zero-crossings as a function of said rectified pulses; and (e) gating said time-dependent pulses with said rectified pulses.

4. A method of transferring binary information comprising the steps of:

(a) generating a frequency shift signal as a function of the binary information;

(b) receiving the frequency shift signal via a telephone line;

(c) converting the signal to pulses representative of zero-crossings;

(d) generating time-dependent pulses as a function of said zero-crossing pulses;

(e) gating the time-dependent pulses with said zero-crossing pulses; and (f) reconverting the gate output to correspond to the binary information input.

5. A demodulator for frequency modulated binary signal comprising:

(a) means to receive said signals;

(b) means for converting said signals into short duration pulses representative of zero-crossings;

(c) circuit means for delaying said zero-crossing pulses for at least the duration of one pulse length;

(d) means for generating time-dependent pulses as a function of said delayed pulses; and (e) amplitude sensitive gating means receiving the time-dependent pulses as one input and the zero-crossing pulses as another input.

6. A demodulator according to claim 5 wherein said circuit means for delaying said zero-crossing pulses includes a one-shot multivibrator followed by differentiator and a pulse inverter.

7. A frequency shift keying receiver for transmitted binary signals comprising:

(a) means for reeciving the binary signals;

(b) means for amplifying and limiting said binary signals into square shaped pulses representative of zero crossings;

(c) means for differentiating said square shaped pulses into a series of short duration pulses;

(d) means for rectifying said short duration pulses;

(e) circuit means for delaying said pulses by at least the length of one pulse;

(f) means for integrating said delayed pulses in accordance with a predetermined RC time constant as a function of frequency input; and (g) means for gating the integrated pulses with said rectified pulses.

8. A frequency shift-keying receiver according to claim 7 including a ramp generator and Schmitt trigger for reconstituting the output pulses of said gating means into the original binary signal.

9. In a frequency shift-keyed data communication system for transmitting binarily encoded signals by means of varying frequency sine waves wherein a binary one and binary zero correspond to a higher and a lower transmitted frequency respectively, an improved demodulator comprising:

means for receiving said transmitted signals and for generating substantially square wave signals, the transitions of which correspond to the respective zero-crossovers of said transmitted signals, means for differentiating said square wave signals, integrator means for generating a time dependent waveform in response to at least predetermined ones of said differentiated square waves, and detector means including an AND gate responsive to at least predetermined amplitude signals emanating from said integrator means and to at least predetermined signals emanating from said differentiator means for detecting the presence of a signal indicative of a binary one.

10. The demodulator defined in claim 9 additionally including a full wave rectifier for rectifying the pulses emanating from said differentiator means and delay means for delaying said signal coupled from said rectifier to the input of said integrator means.

11. The demodulator defined in claim 9 additionally including first and second oppositely poled symmetric current conductive means for selectively coupling pulses of opposite polarity emanating from said differentiator means to said integrator means and to said AND gate means respectively.

12. A fascimile receiver comprising:

means for receiving transmitted varying frequency sine wave signals wherein a first predetermined frequency corresponds to a binary one and wherein a second predetermined frequency corresponds to a binary zero, means for generating substantially square wave pulses in response to the receipt of said varying frequency pulses wherein the transitions of said square waves correspond to the zero crossovers of said received varying frequency signals, means for differentiating said square wave pulses, integrator means for developing time dependent waveforms in response to at least predetermined ones of said differentiated pulses wherein each time dependent waveform remains above a predetermined threshold level for a predetermined portion of a period of one of said tranmsitted frequencies, AND gate means responsive to at least predetermined ones of said differentiated square waves and to said time dependent waveforms for determining the output level of said time dependent waveform relative to said threshold level, and means responsive to an output signal from said AND gate means for actuating marking means in cooperable juxtaposition with record supporting means.

References Cited

UNITED STATES PATENTS

| | | | |
|---|---|---|---|
| 3,078,344 | 2/1963 | Crafts et al. | 178—88 |
| 3,233,181 | 2/1966 | Calfee | 325—30 X |

ROBERT L. GRIFFIN, *Primary Examiner.*

J. T. STRATMAN, *Assistant Examiner.*